United States Patent [19]

Toh et al.

[11] Patent Number: 5,373,033
[45] Date of Patent: Dec. 13, 1994

[54] CASTING COMPOSITION

[75] Inventors: Huan K. Toh, Fullarton; Chong M. Kok, Flagstaff Hill; Michael Pittolo, Glenelg East, all of Australia

[73] Assignee: Sola International Holdings Limited, Lonsdale, Australia

[21] Appl. No.: 189,769

[22] Filed: Feb. 1, 1994

Related U.S. Application Data

[63] Continuation of Ser. No. 781,392, Oct. 23, 1991, abandoned, which is a continuation-in-part of Ser. No. 669,859, Mar. 15, 1991, abandoned.

[30] Foreign Application Priority Data

Apr. 20, 1990 [AU] Australia .................. PJ9746

[51] Int. Cl.$^5$ .......................... C08F 236/22
[52] U.S. Cl. ...................... 522/96; 526/301; 526/313; 526/292.3; 522/92
[58] Field of Search .......... 526/292.3, 301, 313; 522/92, 96

[56] References Cited

U.S. PATENT DOCUMENTS

| | | | |
|---|---|---|---|
| 4,347,174 | 8/1982 | Nagase et al. | 523/116 |
| 4,487,904 | 12/1984 | Fukuda et al. | 526/301 |
| 4,912,185 | 3/1990 | Toh | 526/301 |
| 4,931,523 | 6/1990 | Watanabe et al. | 526/292.3 |
| 5,183,870 | 2/1993 | Fukushima et al. | 526/273 |

FOREIGN PATENT DOCUMENTS

| | | |
|---|---|---|
| 81216/87 | 5/1988 | Australia . |
| 0269366 | 6/1988 | European Pat. Off. . |
| 57-116301 | 7/1982 | Japan . |
| 2176794A | 1/1987 | United Kingdom . |

OTHER PUBLICATIONS

English Abstract of Japanese No. 57-116301, "Synthetic Resin Lens e.g. for Spectacles, Camera, etc.—Consisting of Monomer to Increase Scratch Resistance, Second Monomer to Increase Softness and Shock Resistance etc.", Matsushima Kogyo K.K., Jan. 12, 1981.

*Primary Examiner*—Mark Nagumo
*Attorney, Agent, or Firm*—Burns, Doane, Swecker & Mathis

[57] ABSTRACT

A cross-linkable polymeric casting composition including

A) a polyoxy alkylene glycol diacrylate or dimethacrylate;

B) a monomer having a recurring unit derived from at least one radical-polymerisable bisphenol monomer capable of forming a homopolymer having a refractive index of more than 1.55; and C) a urethane monomer having 2 to 6 terminal groups selected from a group comprising acrylic and methacrylic groups.

23 Claims, No Drawings

CASTING COMPOSITION

CROSS REFERENCE TO RELATED APPLICATION

This application is a continuation of application Ser. No. 07/781,392 filed Oct. 23, 1991 (now abandoned) which is a continuation-in-part of application Ser. No. 07/669,859, filed Mar. 15, 1991 (now abandoned).

The present invention relates to the manufacture of plastic optical articles such as video discs and ophthalmic lenses. The most widely used plastic ophthalmic lens material is polymerised diethylene glycol bis (allyl carbonate). The polymer has proved a satisfactory material for the manufacture of ophthalmic lenses because of a combination of features, including excellent transmission, resistance to discolouration, high strength and high impact resistance. The material has a reasonable abrasion resistance and can be coated to improve that resistance.

The manufacturing process involves the polymerisation of diethylene glycol bis (allyl carbonate) by curing the material within a pair of glass moulds sealed by a gasket and held together by a clip. The cure times are lengthy and can be as long as 16 hours or more. Such extended cure times not only mean that a large stock of glass moulds is required but that also, warehouse stocks of cast polymerised lenses are high so as to meet order requirements as they arise.

There has been a long felt need for a material which could be cast using the existing arrangements with a considerably reduced cure time while still producing a lens with all the desirable characteristics of those made with diethylene glycol bis (allyl carbonate).

Urethane acrylates and methacrylates have been widely used in the formulation of coating compositions, photosensitive compositions for making flexographic printing plates, adhesives and dental filling materials. In such formulations the urethane material is usually chosen so as to have a high viscosity and low shrinkage and forms the principal component of any formulation.

United Kingdom Patent GB 2176794A discloses copolymers including polyethylene glycol dimethacrylate and other dimethacrylates suitable for processing into optical lenses. These copolymers are claimed to have a high refractive index, a high Abbe number, reduced chromatic aberation and excellent impact strength, moldability, polishability and dyeability. Further, in Australian Patent Application 81216/87, the entire disclosure which is incorporated herein by reference, applicant describes a cross-linkable casting composition including at least polyoxyalkylene glycol diacrylate or dimethacrylate and at least one poly functional unsaturated cross-linking agent. Whilst the lenses produced from the prior art compositions provide advances in the art, difficulties may be encountered in certain applications. For example, difficulties may be encountered in some patients in fitting lenses made from such compositions. Eye discomfort, including eye fatigue problems, may be encountered. Moreover, such lenses have been found to be cosmetically unattractive.

Accordingly, it is an object of the present invention to overcome, or at least alleviate, one or more of the difficulties related to the prior art.

Accordingly, the present invention provides a crosslinkable polymeric casting composition including at least one polyoxy alkylene glycol diacrylate or dimethacrylate;

at least one monomer including a recurring unit derived from at least one radical-polymerisable bisphenol monomer capable of forming a homopolymer having a high refractive index; and at least one urethane monomer having terminal acrylic and/or methacrylate groups.

The crosslinkable polymeric casting composition according to the present invention may be utilised in the preparation of an optical article. The optical article may be characterised by being thinner and/or lighter than known prior art articles whilst retaining good abrasion resistance and impact resistance.

By the term "high refractive index", as used herein, we mean a polymer having a refractive index of at least approximately 1.55, preferably 1.57 more preferably 1.60.

The at least one polyoxy alkylene glycol diacrylate or dimethacrylate compound according to the present invention may include ethylene oxide or propylene oxide repeating units in its backbone. An ethylene glycol derivative is preferred.

Preferably from approximately 6 to 14, preferably 6 to 11 alkylene oxide repeating units may be included.

A polyethylene glycol dimethacrylate is preferred. A polyethylene glycol dimethacrylate with an average molecular weight of the order of 600 is preferred. One suitable material is that sold under the trade name NKESTER 9G by SHIN NAKAMURA which has an average molecular weight of 536. The average number of ethylene oxide polymerised units is 9. Alternatively, an NK Ester 6G having an average number of 6 ethylene oxide polymerised units or NK Ester 14G having an average number of 14 ethylene oxide polymerised units may be used. The general structure of the nG type NK Ester is

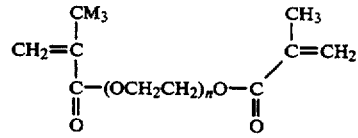

where n is the number of the ethylene oxide polymerised units.

It is also possible to use mixtures of polyethylene glycol diacrylates and dimethacrylates. Mixed esters may also be used. For example, a polyethylene glycol dimethacrylate having an average number of 3 to 5 ethylene oxide polymerised units may be used in addition to the high molecular weight diacrylates and dimethacrylates described above. An NK Ester 3G or 4G may be used. The esters including 3 to 5 ethylene oxide polymerised units may be included to reduce the viscosity of the cross-linkable polymeric casting composition. The esters including 3 to 5 ethylene oxide polymerised units may be included to reduce the viscosity of the cross-linkable polymeric casting composition. The esters including 3 to 5 ethylene oxide polymerised units may preferably be present in amounts of from approximately 5 to 30% by weight, preferably 20 to 30% by weight, based on the total weight of the casting composition.

The at least one polyoxy alkylene glycol diacrylate or dimethacrylate component may be present in an amount suitable to provide a viscosity of not greater than approximately 200 cps at 25° C. to the pre-polymerized composition. The diacrylate or dimethacrylate comethoxylated dimethacrylate sold under the trade designation ATM20 by Ancomer and has the structure

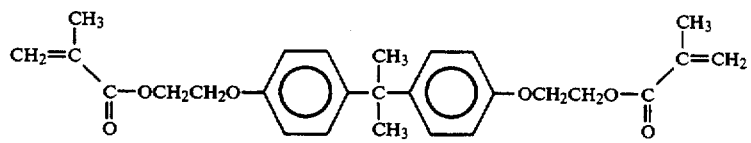

pound may be present in amounts of from approximately 5% by weight to 60% by weight based on the total weight of the casting composition. The diacrylate or dimethacrylate component is preferably present in A glycidyl ester of bisphenol A sold under the trade designation Bis GMA by Freeman Chemicals has also been found to be suitable. This material has the structure

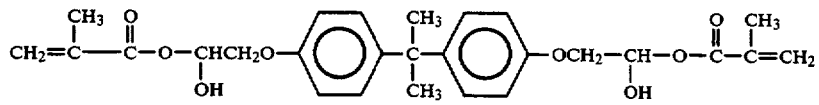

amounts of approximately 15% by weight to 55% by weight, more preferably 20 to 45% by weight.

The dimethacrylates are more preferred than the diacrylates as the diacrylates need to be used with care, as with their greater reactivity than the corresponding dimethacrylates, distortion may be introduced into the Further, halogenated high index bisphenol compounds have also been shown to be useful in the present, and amongst those which may be used is a material which is sold under the trade designation NK Ester 534M by Shin Nakamura.

This material has the structure

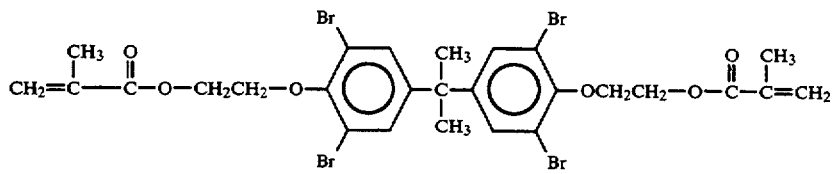

lens blank as cast due to strain. Any particular diacrylate also tends to be more water absorbing than the corresponding dimethacrylate.

Water absorption can occur during tinting in boiling water and can result in cracking subsequent to tinting.

The at least one high index bisphenol monomer component in the cross-linkable casting composition may include recurring units capable of forming a homopolymer having a refractive index of approximately 1.55, or greater.

The high index bisphenol monomer component may be a polyacrylate or polymethacrylate ester of a bisphenol compound.

The high index bisphenol monomer may be selected from compounds

High index brominated bisphenol monomers sold under the trade designations SR803, SR804, GX6099 and GX6094 by Dai-Ichi-Kogyo Seiyaku (DKS) Co. Ltd. have also been found to be suitable.

The high index bisphenol monomer may be present in amounts of from approximately 10 to 60% by weight, preferably 20 to 55% by weight based on the total weight of the casting composition.

In addition, a secondary high index monomer other than a high index bisphenol monomer may be used in the casting composition according to the present invention in minor amounts. These include styrene, and derivatives thereof; high index acrylate and methacrylate esters including benzyl and phenyl methacrylate; n-vinyl pyrrolidone; and high index aromatic urethanes.

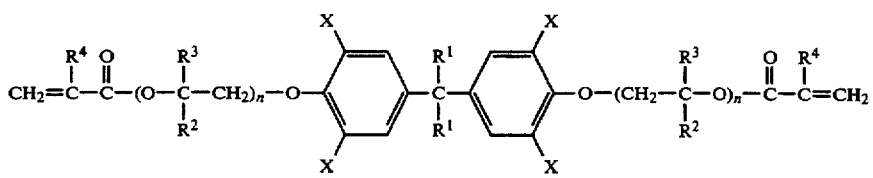

where $R^1$ is methyl, ethyl or hydrogen; $R^2$ is hydrogen, methyl or ethyl; $R^3$ is hydrogen, methyl or hydroxyl; $R^4$ is hydrogen, methyl or ethyl; X is a halogen, preferably chlorine, bromine or iodine, or hydrogen; and n is an integer having a value of 0 to 8.

Representative monomers of the above-described class include: dimethacrylate and diacrylate esters of 4,4' bishydroxy-ethyoxy-bisphenol A and the like.

A preferred high index bisphenol compound is bisphenol A ethoxylated dimethacrylate. Bisphenol A The secondary high index monomer components may be included to modify overall refractive index of the optical article formed therefrom.

The secondary high index monomer component may be present in amounts of from 0 to approximately 20% by weight based on the total weight of the casting composition. The secondary high index monomer component is present preferably in amounts of approximately 5% to 15% by weight, more preferably approximately 5 to 10% by weight. It is preferred that the secondary high index monomer component is not present in amounts greater than 20% since the optical article formed therefrom may exhibit reduced barcol hardness and/or reduced abrasion resistance. This may be compensated for, to some degree by increasing the amount of high index bisphenol monomer used.

As stated above, the cross-linkable polymeric casting composition includes at least one urethane monomer having terminal acrylic and/or methacrylic groups. The number of such groups can vary from 2 to 6, and we have found that satisfactory materials for use in this invention are those in which the molecular weight of the compound divided by the functionality or number of groups is 100–300. Suitable materials falling within this definition include materials supplied under the trade names U-4H, U-4HA and U-6HA by Shin Nakamura, NF-201 and NF-202 by Mitsubishi Rayon. These monomers are included to improve physical toughness without causing the lens material to become too brittle. Impact resistance is improved without adversely affecting abrasion resistance.

The structures of some of these materials are given below

Certain urethane monomers, for example the aromatic urethane methacrylate NF202, are high refractive index components and may function alternatively or in addition as the or one of the secondary high index monomer component(s) of the casting composition.

The structures contained within any particular monomer can be selected from those containing aliphatic, aromatic, and cyclic structures of other forms. We have found that in the formulations of the present invention, the tetracrylic urethane monomer gives particularly satisfactory results.

The inclusion of the tetracyclic urethane monomer may provide a product of increased hardness.

The tetracrylic urethane monomer according to a preferred aspect of the present invention may be a compound of the formula

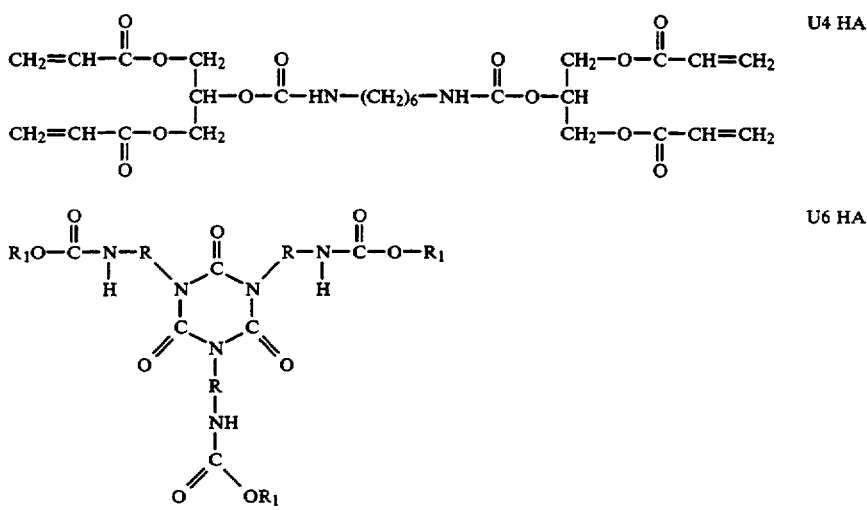

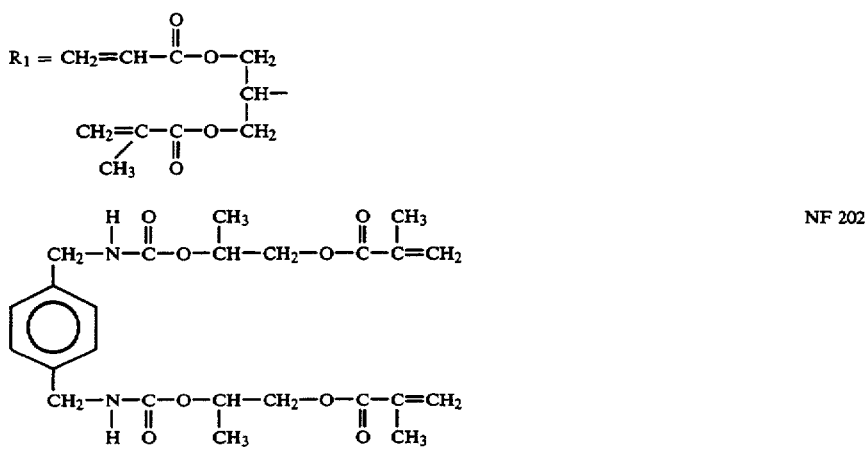

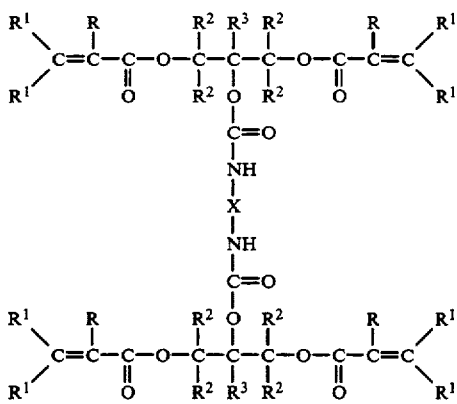

wherein

R, $R^1$, $R^2$ and $R^3$ which may be the same or different are selected from hydrogen, alkyl of 1 to 6 carbon atoms or a substituted alkyl of 1 to 6 carbon atoms; and X is an organic residue having 1 to 20 carbon atoms. X may be an aliphatic, alicyclic or aromatic residue. X may be a $C_1$-$C_{20}$ alkyl, alkoxy, alkylamino, alkyl carbonyl alkoxy carbonyl, alkylamido or alkoxy amide group.

X may be substituted with one or more halogen, hydroxyl, nitro, amino, alkyl or alkoxy groups.

The urethane monomer may be present in any suitable amount to provide a desired level of hardness. The urethane monomer may be present in amounts of from approximately 2.5 to approximately 20% by weight, preferably 5 to 10% by weight based on the total weight of the casting composition.

Where X is an aromatic group, the article formed therefrom may exhibit a high refractive index and be suitable for applications where this is desirable. A urethane monomer having the following structure is preferred:

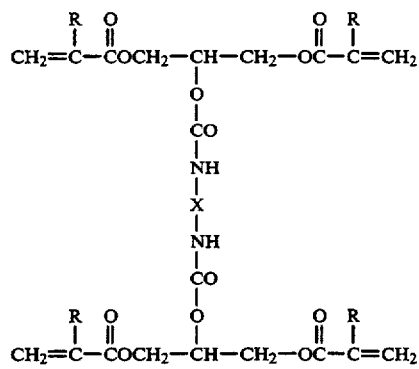

wherein R is a hydrogen atom or a methyl group or a substituted methyl group and X is an organic residue having 2-20 carbon atoms, preferably 6 carbon atoms.

In the above formula, while X may be any of organic residues having 2-20 carbon atoms, it is generally an aliphatic or alicyclic hydrocarbon residue, the backbone of which may be interrupted by oxygen. Specific examples thereof are as follows: Examples of aliphatic hydrocarbon residues include (i) alkylene groups such as —$CH_2CH_2$—, —($CH_2$)$_3$—, ($CH_2$)$_4$—, —($CH_2$)$_6$—.

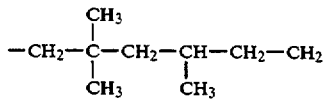

—($CH_2$)$_9$—, —($CH_2$)$_{18}$—, —($CH_2$)$_{11}$—$CH_2$ etc.

(ii) alkoxyalkylene groups such as —$C_2H_4OC_2H_4$—, —($CH_2$)$_6$—O— ($CH_2$)$_6$ etc. and the like.

The urethane monomer may be produced by reacting 2 moles of a glyceric di(meth)acrylate

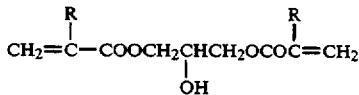

and 1 mole of an organic diisocyanate compound (OC-N—X—NCO). The glycerin di(meth)acrylates are known compounds which can be obtained by reacting glycidyl (meth)acrylate and (meth)acrylic acid. The organic diisocyanate compounds are known compounds, many of which are on the market and thus easily available. The organic diisocyanate comply with the definition of X and thus their examples include ethylene diisocyanate, trimethylene diisocyanate, tetramethylene diisocyanate, hexamethylene diisocyanate, 2,2,4-trimethylhexamethylene diisocyanate. The reaction of the glycerin di(meth)acrylate and the organic diisocyanate may be conducted using a catalyst commonly used for reactions of alcohols and isocyanates (e.g. dibutyltin dilaurate) in the absence of a solvent, or by dissolving in a solvent. The solvent used is an organic solvent having no active hydrogen such as methyl chloride, benzene, toluene, etc. The reaction is preferably carried out at a temperature of up to 100° C. (generally 20°-90° C.), thereby free radical polymerisation of the di(meth)acrylate monomer can be prevented, and a reaction time of 1-2 hours affords the monomer almost in a quantitative yield. After the reaction, the monomer may be obtained by removing the reaction solvent.

In a preferred aspect of the present invention the cross-linkable polymeric casting composition may further include at least one poly-functional unsaturated cross-linking agent.

The poly functional unsaturated cross-linking agent according to the present invention may be a tri- or tetra-functional vinyl, an acrylic or methacrylic monomer. The cross-linking agent may be a short chain monomer for example trimethylol propane trimethacrylate, pentaerythritol triacrylate or tetracrylate, or the like. Other polyfunctional cross-linking agents which may be used include NK Ester TMPT, NK Ester A-TMPT, NK Ester A-TMM-3, NK Ester A-TMMT, di-trimethylol propane tetraacrylate, trimethylolpropane triacrylate, pentaerythritrol tetramethacrylate, dipentaerythritol monohydroxypenta acrylate, pentaerythritol triacrylate, ethoxylated trimethylolpropane triacrylate, ethoxylated trimethylol-propane trimethyacrylate.

It has been found when operating at the lower end of the preferred range 40 to 60% for the diacrylate or dimethacrylate component that it is preferable to select as the polyfunctional unsaturated cross linking agent, material such as that sold under the trade name SR-454 which is an ethoxylated trimethylol propane triacrylate, and has the following structure:

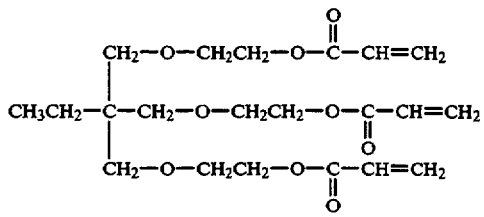

The poly functional unsaturated cross-linking agent may be present in amounts of from approximately 5 to 20% by weight, preferably approximately 10% by weight based on the total weight of the casting composition.

The cross-linkable casting composition according to the present invention may further include a cross-linking initiator. The cross-linking initiator may be a heat and/or ultraviolet (UV) initiator.

The compositions are preferably cured by a combination of UV radiation and heat. The combination of UV radiation and heat may reduce the possibility of incomplete curing for example due to the phenomenon known as "radical trapping".

The composition, with the addition of approximately 0.2 to 2.0% by weight of cross-linking initiator may be exposed to UV radiation for between 0.5 and 10 seconds.

Any commercially viable UV curing system may be used. We have used a Fusion system with microwave driven lamps. A number of fusion bulbs with different output Spectra may be considered. Presently we prefer to "D" bulb and the "V" bulb.

One source we have found satisfactory is a 10 inch, 300 watt/inch mercury lamp. The mould assembly is then heated to 100° C. for one hour or the lens may be removed from the assembly and heated in air for about one hour at 100° C. This means that fully cured lenses can be manufactured, if desired, in about one hour. Heat curing can also be used without any use of UV radiation.

Typically 2-4 passes under the UV lamps plus an hour of heat treatment at 100° C. completes the cure.

Any suitable UV initiator may be used. An initiator available under the trade designation Irgacure 184 has been found to be satisfactory. More than one curing agent may be present. It has been possible to operate with a relatively low level of initiator of between approximately 0.05 and 0.25% by weight.

A range of photoinitiators available commercially can be used, depending on sample thickness, type of UV lamp used and the absorption wavelength of the monomer mix.

The following photoinitiators have been found to be suitable.

Alcolac Vicure 10—isobutyl benzoin ether
Alcolac Vicure 30—isopropyl benzoin ether
Alcolac Vicure 55 (V55)—methyl phenyl glyoxylate
Ciba Geigy Irgacure 184—1-hydroxy cyclohexyl phenyl ketone
Ciba Geigy Irgacure 651—benzildimethyl ketal
Ciba Geigy Irgacure 907—2-methyl-1-{4-(methylthio)phenyl}—2-morpholino-propanone-1
Merck Darocur 1664
Rohm Catalyst 22

A mixture of two or more of the above may also be used. Additionally, combination of photoinitiator mixtures or photoinitiator mixtures with a heat induced free radical initiator such as peroxides, peroxypercarbonates or an azo compound may also be employed.

As an alternative to photo curing a heat curing may be used, for example 1,1 di-tert butyl peroxy-3,3,5-trimethylcyclohexane or secondary isopropyl percarbonate.

Other additives may be present which are conventionally used in casting compositions such as inhibitors, dyes, UV stabilisers and materials capable of modifying refractive index. Mould release agents can be added but they are in general not required with the compositions used in the method of the present invention. Such additives may include:

UV Absorbers including
Ciba Geigy Tinuvin P—2(2'-hydroxy-5'methyl phenyl) benzotriazole
Cyanamid Cyasorb UV 531—2-hydroxy-4-n-octoxybenzophenone
Cyanamid Cyasorb UV 5411—2(2-hydroxy-5-t-octylphenyl)benzotriazole
Cyanamid UV 2098—2 hydroxy-4-(2-acryloyloxyethoxy) benzophenone
National S+C Permasorb MA—2 hydroxy-4-(2 hydroxy-3methacryloxy)propoxy benzophenone
Cyanamid UV24—2,2' -dihydroxy-4-methoxybenzophenone
BASF UVINUL 400—2,4 dihydroxy-benzophenone
BASF UVINUL D-49—2,2' -dihydroxy-4,4' dimethoxy-benzophenone
BASF UVINUL D-50—2,2', 4,4' tetrahydroxy benzophenone
BASF UVINUL D-35—ethyl-2-cyano-3,3-diphenyl acrylate
BASF UVINUL N-539—2-ethexyl-2-cyano-3,3-diphenyl acrylate
Ciba Geigy Tinuvin 213
Hindered amine light stabilizers (HALS), including
Ciba Geigy Tinuvin 765/292—bis (1,2,2,6,6-pentamethyl-4-piperidyl)sebacate
Ciba Geigy 770—bis (2,2,6,6-tetramethyl-4-piperidinyl) sebacate
Antioxidants including
Ciba Geigy Irganox 245—triethylene glycol-bis-3-(3-tert butyl-4-hydroxy-5-methyl phenyl)propionate
Irganox 1010—2,2-bis{{3-{3,4-bis(1,1-dimethylethyl)-4-hydroxyphenyl}-1-oxopropoxy}methyl}-1,3-propanediyl 3,5-bis (1,1-dimethyl ethyl)-4-hydroxy benzene propanoate
Irganox 1076—octadecyl 3-(3',5'-di=tert=butyl(-4'-hydroxy phenyl) propionate
Anticolouring agents including
Triphenyl phosphine
9, 10 dihydro-9-oxa-10-phosphaphenanthrene-1-oxide
Cure modifiers including
Dodecyl mercaptan
Butyl mercaptan
Thiophenol Other monomeric additives can be present in amounts up to 10% by weight as diluents, and include monomers such as methacrylic acid, vinyl silanes, methyl allyl, hydroxy ethyl, methacrylate. Other monomeric additives may be included to improve processing and/or material properties, these include:

methacrylic acid, maleic anhydride, acrylic acid
adhesion promoters/modifiers such as Sartomer 9008, Sartomer 9013, Sartomer 9015 etc dye-enhancing, pH-adjusting monomers like Alcolac SIPOMER 2MIM a charge-reducing cationic monomer to render the material more antistatic, example Sipomer Q5-80 or Q9-75.

hydrophobic comonomers; Shin Nakamura NPG, P9-G etc. to reduce the water absorption of the material viscosity modifiers Accordingly, in a preferred aspect of the present invention the cross-linkable polymeric casting composition may further include at least one aliphatic glycol dimethacrylate or diacrylate.

The aliphatic glycol dimethacrylate or diacrylate may function to reduce the viscosity of the composition and thus improve the processing characteristics of the composition.

An ethylene, propylene, butylene or pentylene diacrylate or methacrylate may be used. A butylene glycol dimethacrylate is preferred. One suitable material is that sold under the trade designation NK ester BD by Shin Nakamura.

A neopentyl glycol dimethacrylate may be used. One suitable material is that sold under the trade designation NK ester NPG by Shin Nakamura.

The aliphatic glycol dimethacrylate or diacrylate may be present in amounts of approximately 1 to 10% by weight, preferably 2.5 to 5% by weight based on the total weight of the casting composition.

In a further aspect of the present invention there is provided a polymeric article formed from a cross linkable casting composition as described above. The polymeric article may be an optical article. The optical article may provide characteristics equal to or greater than those achievable with articles made from diethylene glycol bis(allyl carbonate) but with a considerably reduced cure time and substantially increased throughput. The optical article may be further characterised by having reduced weight and/or thickness relative to the prior art, whilst retaining good abrasion resistance and impact resistance.

The overall refractive index may be in the mid refractive index range of from approximately 1.51 to 1.57, preferably 1.53 to 1.57.

The optical articles prepared by the method of this invention include camera lenses, ophthalmic lenses and video discs.

The casting composition may be formed into a suitable article by mixing in a convenient vessel the components making up the material, and then adding the curing catalyst and/or photo-initiator. The mixed material is then degassed or filtered. As the curing time is substantially reduced the casting process may be undertaken on a continuous or semi-continuous basis.

The present invention will now be more fully described with reference to the accompanying examples. It should be understood, however, that the description following is illustrative only and should not be taken in any way as a restriction on the generality of the invention described above.

EXAMPLE 1

A cross-linkable casting composition having the following components was prepared

| | |
|---|---|
| 9G (polyethylene glycol dimethacrylate | 45% |
| ATM20 (high index: bisphenol A ethoxylated dimethacrylate) | 46% |
| U4HA (urethane tetracrylate) | 5% |
| BD (1,3 butylene glycol dimethacrylate) | 4% |

The monomer mix was prepared in a beaker together with 0.2% V55 as the UV initiator.

The casting material was used to fill the space between a pair of glass moulds separated by a plastic gasket at their periphery and held together by a clip. The mould was then passed 4 times under a UV lamp. This was followed by a 1 hour extended cure at 100° C.

EXAMPLES 2–14

Example 1 was repeated under similar conditions with monomer mixes as designated in Table 1 below. The results achieved are also given in Table 1. Satisfactory lenses were achieved in each case.

COMPARATIVE EXAMPLES 15–23

Example 1 was repeated with monomer mixes as designated in Table 1 below.

Comparative Examples 15 to 19 illustrate the contribution of the various components to the casting composition according to the present invention.

Comparative Example 15 which omits a tetracrylic urethane monomer exhibits unacceptably low barcol hardness.

Comparative Example 16 which omits a high index monomer exhibits a low refractive index and poor Impact strength.

Comparative Examples 17 to 19 illustrate the importance of the polyoxyalkylene glycol ester component for Impact strength and abrasion resistance.

Comparative Examples 20 and 21 illustrate the importance of the concentration of other high index monomers in maintaining Barcol hardness and abrasion resistance.

Comparative Examples 22 and 23 which omit a high index bisphenol compound exhibit poor abrasion and Barcol hardness.

TABLE 1

| Example | Casting Material | Density | RI | Impact | YI (1.8 mm Plano) | Taber Abrasion | Barcol |
|---|---|---|---|---|---|---|---|
| 1 | 9G/ATM20/U4HA/BD 45/46/5/4 | 1.21 | 1.54 | Good | 0.9 | Good | 21 |
| 2 | 9G/ATM20/U4HA 45/45/10 | 1.21 | 1.53 | Good | 1.2 | Good | 23 |
| 3 | 9G/ATM20/U4HA 45/50/5 | 1.21 | 1.54 | Good | 0.9 | Good | 23 |
| 4 | 9G/S454/NF202/ATM20 30/20/30/20 | 1.22 | 1.53 | Good | 1.1 | Good | 34 |
| 5 | 9G/ATM20/NK534M/U4H4 35/30/25/10 | 1.30 | 1.55 | Good | 1.4 | Good | 29 |
| 6 | 9G/4G/ATM20/U4HA/BD | 1.21 | 1.53 | Good | 1.2 | Good | 32 |

TABLE 1-continued

| Example | Casting Material | Density | RI | Impact | YI (1.8 mm Plano) | Taber Abrasion | Barcol |
|---|---|---|---|---|---|---|---|
|  | 20/25/45/5/3 |  |  |  |  |  |  |
| 7 | 14G/S454/NF202/ATM20 30/10/40/20 | 1.22 | 1.53 | Good | 0.9 | Good | 27 |
| 8 | 9G/BisGMA/NF202 40/40/20 | 1.23 | 1.54 | Good | 1.3 | Good | 35 |
| 9 | 9G/BisGMA/U6HA 45/40/15 | 1.23 | 1.53 | Good | 1.6 | Good | 28 |
| 10 | 9G/NK534M/U6HA 40/40/20 | 1.39 | 1.54 | Good | 1.0 | Good | 26 |
| 11 | 9G/S454/ATM20/U6Ha 45/25/10/20 | 1.21 | 1.52 | Good | 0.9 | Good | 15 |
| 12 | 9G/S454/U6HA/ATM20 30/25/20/25 | 1.21 | 1.52 | Good | 1.05 | Good | 23 |
| 13 | 9G/U6HA/ATM20/BM 45/20/25/10 | 1.21 | 1.53 | Good | 0.94 | Good | 17 |
| 14 | 9G/NF202/ATM20/BM 40/20/30/10 | 1.21 | 1.54 | Good | 1.14 | Good | 23 |
| 15* | 9G/ATM20 50/50 | 1.21 | 1.54 | Good | 1.2 | Good | 10 low |
| 16* | 9G/U4HA 40/60 | — | 1.50 | Poor | — | Good | — |
| 17* | U6HA/NF202/ATM20 40/20/40 | 1.23 | 1.54 | Fair | 1.3 | Poor | 51 |
| 18* | S454/U6HA/ATM20 20/30/50 | 1.22 | 1.54 | Fair | 1.2 | Poor | 31 |
| 19* | S454/NF202/ATM20 20/30/50 | 1.21 | 1.55 | Fair | 1.4 | Poor | 42 |
| 20* | 9G/U6HA/ATM20/BM 45/20/10/25 | 1.21 | 1.53 | Fair | 0.89 | Poor | 10 low |
| 21* | 9G/NF202/ATM20/BM 40/10/30/20 | 1.22 | 1.54 | Good | 1.4 | Poor | 17 |
| 22* | 9G/U4HA/BM 45/10/45 | 1.21 | 1.53 | Fair | 1.18 | Poor | 0 |
| 23* | 9G/U4HA/PM 45/10/45 | 1.22 | 1.54 | Fair | 1.11 | Poor | 19 |

*Comparative Examples

We claim:

1. A cross-linkable polymeric casting composition suitable for use in the formation of a transparent optical article following curing for about one hour, said composition having a viscosity not greater than approximately 200 cps. at 25° C. and consisting essentially of:
   (i) as Component (A), a polyoxyalkylene glycol diacrylate or dimethacrylate having 6 to 14 alkylene oxide repeating units, said Component (A) being present in an amount of from approximately 5 to 60% by weight based upon the total weight of the casting;
   (ii) as Component (B), a monomer having a recurring unit derived from at least one radical-polymerizable bis-ethylenically unsaturated bisphenol monomer capable of forming a homopolymer having a refractive index of more than 1.55, said Component (B) being present in an amount of approximately 10 to 60% by weight based upon the total weight of the casting composition;
   (iii) as Component (C), approximately 2.5 to approximately 20% by weight based upon the total weight of the casting composition of a urethane acrylate or methacrylate monomer having 2 to 6 terminal groups selected from acrylic groups, methacrylic groups, and a mixture of such groups; and
   (iv) as Component (D), a polymerization initiator selected from heat initiators, ultraviolet initiators, or combinations of heat initiators and ultraviolet initiators.

2. A casting composition according to claim 1, in which Component (A) has ethylene oxide or propylene oxide repeating units in its backbone.

3. A casting composition according to claim 1, in which Component (A) is derived from ethylene glycol.

4. A casting composition according to claim 1, in which Component (A) has from 6 to 11 alkylene oxide repeating units.

5. A casting composition according to claim 1, in which Component (A) is a polyethylene glycol dimethacrylate.

6. A casting composition according to claim 1, in which Component (A) is supplemented by a polyethylene glycol dimethacrylate having an average number of 3 to 5 ethylene oxide units, in amounts of from approximately 5 to 30% by weight, based on the total weight of the casting composition.

7. A casting composition according to claim 1, in which Component (B) is a polyacrylate or polymethacrylate ester of a bisphenol compound.

8. A casting composition according to claim 7, in which Component (B) is selected from compounds having a general formula represented by:

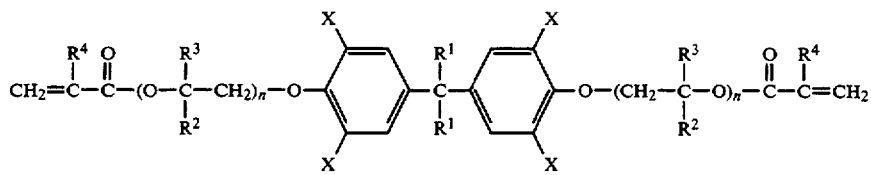

wherein $R^1$ is methyl, ethyl or hydrogen; $R^2$ is hydrogen, methyl or ethyl; $R^3$ is hydrogen, methyl or hydroxyl; $R^4$ is hydrogen, methyl or ethyl; X is a halogen, or hydrogen, and n is an integer having a value of 0 to 8.

9. A casting composition according to claim 8, in which Component (B) is bisphenol A ethoxylated dimethacrylate.

10. A casting composition according to claim 8, in which Component (B) is halogenated.

11. A casting composition according to claim 1, in which Component (B) further comprises a secondary high index monomer other than a high index bisphenol monomer to modify overall refractive index of the optical article formed therefrom, the secondary high index monomer component being present in an amount of from approximately 5 to 15% by weight based on the total weight of the casting composition.

12. A casting composition according to claim 11, wherein Component (C) functions in addition as at least part of the secondary high index monomer.

13. A casting composition according to claim 1, in which Component (C) is selected from urethane monomers whose molecular weight divided by the number of terminal acrylic and/or methacrylic groups lies in the range 100–300.

14. A casting composition according to claim 1, in which Component (C) is a tetracrylic urethane monomer selected from compounds having a general formula represented by:

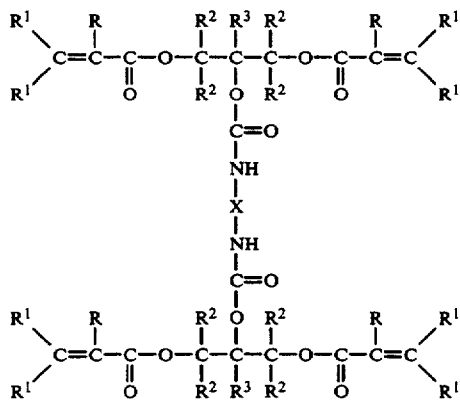

wherein R, $R^1$, $R^2$ and $R^3$ which may be the same or different are selected from hydrogen, alkyl of 1 to 6 carbon atoms or a substituted alkyl of 1 to 6 carbon atoms; and X is an organic residue having 1 to 20 carbon atoms.

15. A casting composition according to claim 1, in which Component (C) is present in amount of from approximately 5 to 10% by weight, based on the total weight of the casting composition.

16. A casting composition according to claim 1, further comprising in addition to Components (A), (B), (C) and (D) a poly-functional unsaturated cross-linking agent, in an amount of from approximately 5 to 20% by weight, based on the total weight of the casting composition.

17. A casting composition according to claim 1, further comprising from 1 to 10% by weight of an aliphatic glycol dimethacrylate or diacrylate.

18. A casting composition according to claim 1 wherein said polymerization initiator of Component (D) is an ultraviolet initiator.

19. A casting composition according to claim 1 wherein said Component (B) is bisphenol A ethoxylated dimethacrylate and said polymerization initiator of Component (D) is an ultraviolet initiator.

20. A transparent polymeric optical article having a refractive index in the mid-refractive range of from approximately 1.51 to 1.57, and being formed from a polymerizable casting composition consisting essentially of:

(i) as Component (A), a polyoxyalkylene glycol diacrylate or dimethacrylate having 6 to 14 alkylene oxide repeat units, said Component (A) being present in an amount from approximately 5 to 60% by weight based upon the total weight of the casting composition;

(ii) as Component (B), a monomer having a recurring unit derived from at least one radical-polymerizable bis-ethylenically unsaturated bisphenol monomer capable of forming a homopolymer having a refractive index of more than 1.55, said Component (B) being present in an amount of approximately 10 to 60% by weight based on the total weight of the casting composition;

(iii) as Component (C), approximately 2.5 to approximately 20% by weight based upon the total weight of the casting composition of a urethane acrylate or methacrylate monomer having 2 to 6 terminal groups selected from acrylic groups, methacrylic groups, and mixtures of such groups; and (iv) as Component (D), a polymerization initiator selected from heat initiators, ultraviolet initiators, or combinations of heat initiators and ultraviolet initiators.

21. A transparent polymeric optical article according to claim 20 wherein Component (B) is bisphenol A ethoxylated dimethacrylate.

22. A transparent polymeric optical article according to claim 20 wherein said polymerization initiator of Component (D) is an ultraviolet initiator.

23. A transparent polymeric optical article according to claim 20 wherein said Component (B) is bisphenol A ethoxylated dimethacrylate and said polymerization initiator of Component (D) is an ultraviolet initiator.

* * * * *